(12) United States Patent
Morimatsu et al.

(10) Patent No.: US 6,749,884 B1
(45) Date of Patent: Jun. 15, 2004

(54) MEAT PRODUCT HAVING EFFECT OF INHIBITING INCREASE IN BLOOD CHOLESTEROL

(75) Inventors: Fumiki Morimatsu, Tsukuba (JP); Shinichiro Katsuda, Tsukuba (JP); Mikako Sato, Tsukuba (JP); Masayo Nakagami, Nishinomiya (JP)

(73) Assignee: Nippon Meat Packers, Inc., Osaka (JP)

( * ) Notice: Subject to any disclaimer, the term of this patent is extended or adjusted under 35 U.S.C. 154(b) by 0 days.

(21) Appl. No.: 08/952,475

(22) PCT Filed: May 21, 1996

(86) PCT No.: PCT/JP96/01346

§ 371 (c)(1),
(2), (4) Date: Mar. 9, 1998

(87) PCT Pub. No.: WO96/37119

PCT Pub. Date: Nov. 28, 1996

(30) Foreign Application Priority Data

May 21, 1995 (JP) ............................................. 7-146814

(51) Int. Cl.$^7$ ............................................... A23L 1/317
(52) U.S. Cl. ....................................... 426/646; 426/804
(58) Field of Search ............................ 426/2, 646, 804

(56) References Cited

U.S. PATENT DOCUMENTS

| 3,309,204 A | * | 3/1967 | Helmer et al. ............... 426/646 |
| 3,873,740 A | * | 3/1975 | Terrell ........................ 426/646 |
| 3,943,263 A | * | 3/1976 | Sato et al. ............... 426/646 X |
| 5,164,213 A | * | 11/1992 | Bonkowski .............. 426/646 X |
| 5,626,899 A | * | 5/1997 | Payne et al. ............ 426/646 X |
| 5,858,442 A | * | 1/1999 | Payne et al. ............. 426/646 X |
| 5,876,778 A | * | 3/1999 | Stewart ................... 426/804 X |

FOREIGN PATENT DOCUMENTS

| JP | 623770 | 1/1987 |
| JP | 1112969 | 5/1989 |

OTHER PUBLICATIONS

Gise, "Developing Low Fast Meat Products", Food Technology, pp. 100–108, Apr. 1992.*
van Raaij et al., American Journal of Clinical Nutrition 35: May 1982, pp. 925–934.
van Raaij et al., American Journal of Clinical Nutrition 34: Jul. 1981, pp. 1261–1271.
Okita et al., J. Nutr. Sci. Vitaminol 27: 1981, pp. 379–388.
Mazier et al., Progress in Food and Nutrition Science, vol. 15, 1991, pp. 21–41.

* cited by examiner

Primary Examiner—Arthur L. Corbin
(74) Attorney, Agent, or Firm—Birch, Stewart, Kolasch & Birch, LLP

(57) ABSTRACT

The present invention provides meat products comprising fat contents less than halves of those of conventional meat products and soy protein, and, possessing plasma-cholesterol-suppressing property. Due to reduced fat contents and addition of soy protein with the plasma-cholesterol-suppressing property, the meat products of the invention can improve plasma lipids without reducing favorable texture and taste of the meat products.

8 Claims, 2 Drawing Sheets

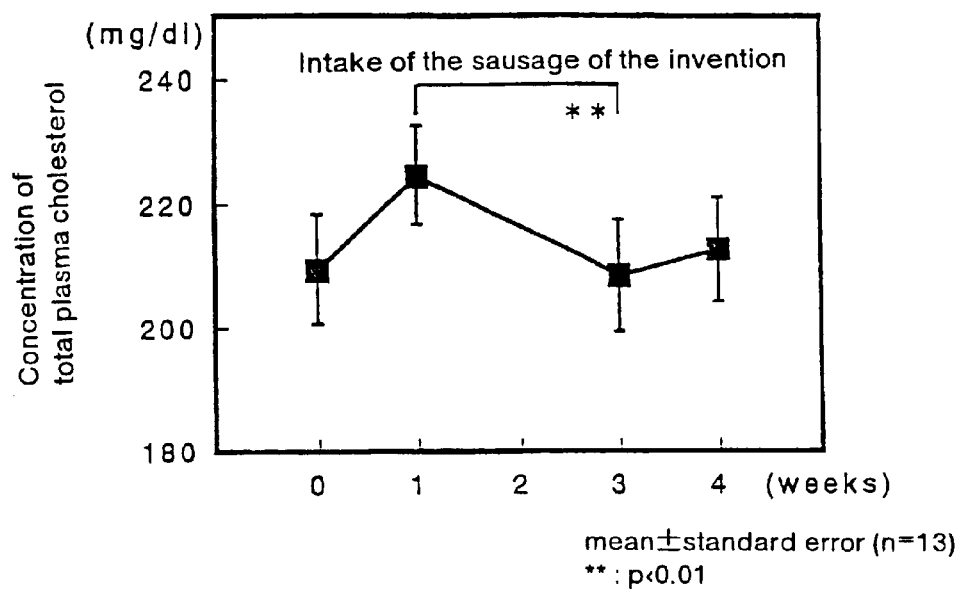
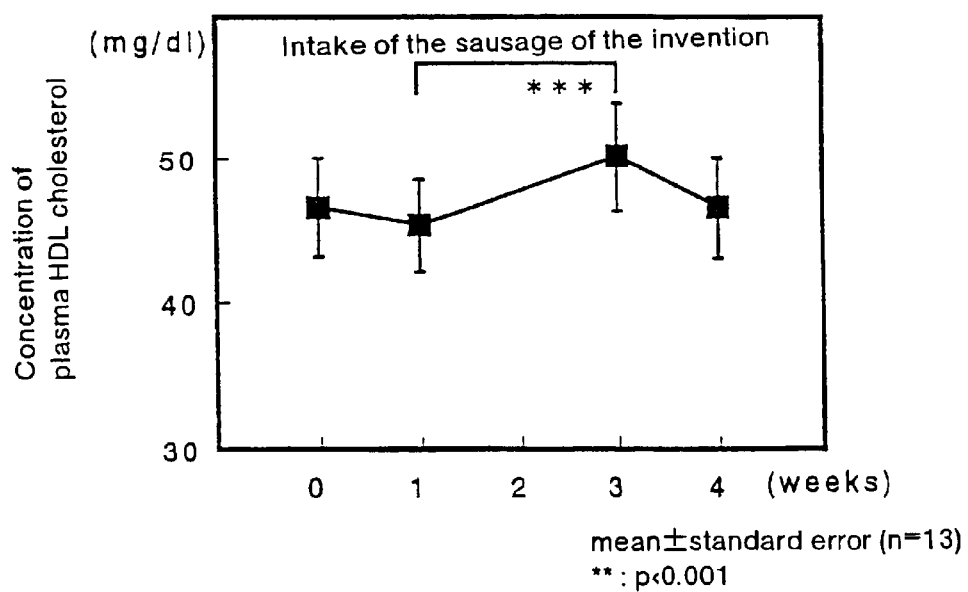

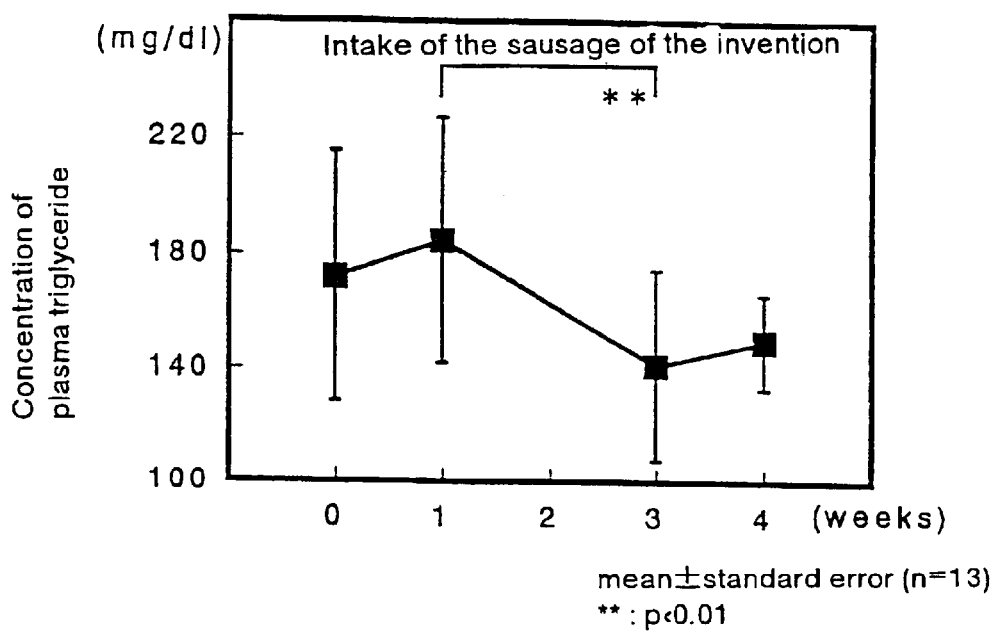

MEAT PRODUCT HAVING EFFECT OF INHIBITING INCREASE IN BLOOD CHOLESTEROL

TECHNICAL FIELD

This invention provides meat products. More particularly, the inventions provides the meat products possessing plasma-cholesterol-level suppressing property and favorable texture and taste.

BACKGROUND OF THE INVENTION

Malignant neoplasm, heart and cerebrovascular diseases have been recognized as three major causes of adults' death of late. Particularly, the number to suffering from and the number of deaths of patient due to ishemic heart diseases including cardiac infarction tends to increase. Basal diseases of the ishemic heart diseases are arterial screlosis and hyperlipidemia (particularly, hypercholetsterolemia). Increases in amount of animal-fat consumption have been regarded as one of the causes of these diseases. According to a Japanese nutrition census carried out in 1992, the increment of animal-protein consumption was praised, but problems caused by the increment of animal-fat consumption as well as that of the energy-intake ratio due to it was pointed out.

To suppress plasma-cholesterol level by diet, it is important to limit the intake of cholesterol and animal fat themselves. It has been well known that plasma-cholesterol levels depend upon the intake of not only dietary fat but also of protein. It has been reported that intake of vegetable protein, particularly soy protein, suppresses plasma-cholesterol level.

As described above an excessive intake of meat products may cause the ishemic heart diseases. However, the meat products are protein-rich, easy-to-eat, delicious and durable foods. The meat products, particularly sausage, contain 10–30% fat, which contributes to supply energy and contributes properties such as texture and taste characteristic to the sausage.

From these viewpoints, it has been desired to develop meat products, in which the fat content is reduced without reducing the flavorabde characteristics of the meat products. For such purposes, the meat products with less fat content have been developed. However, no meat product with favorable texture and taste has ever been developed.

Reduction of the contents in the meat products may be ones means to prevent the ishemic heart diseases. However, more positive measures to suppress the plasma-cholesterol level have been desired.

The present invention was accomplished on the basis of such a background. The purposes of the invention were to develop the meat products with reduced fat contents, plasma-cholesterol-level properties and conventionally accepted favorable texture and taste.

DISCLOSURE OF THE INVENTION

The present invention provides meat products, of which the fat content is less than half of that of conventional meat products. The addition protein with plasma-cholesterol-suppressing properties, is characteristic of the meat products of the invention.

Another invention is a method comprising administration of the above-described meat products to man.

By reducing the fat content and fortifying soy protein with plasma-cholesterol-level suppressing properties, the meat products of the invention can improve plasma lipid levels of man. Moreover, the meat products of the invention possess characteristically favorable texture and taste.

BRIEF DESCRIPTION OF FIGURES

FIG. 1 shows periodical changes in total plasma-cholesterol levels of man when administered the meat product of the invention.

FIG. 2 shows periodical changes in plasma-HDL-cholesterol levels of man when administered the meat product of the invention.

FIG. 3 shows periodical changes in plasma-triglyceride levels of man when administered the meat product of the invention.

THE BEST MODE FOR APPLYING THE INVENTION

The present invention is made up as described above. The fat content of the meat products of the present invention are reduced to half of those of conventional meat products on weight basis. For example, in case of a Wiener sausage, the fat content of a conventional sausage is 24.8 g of 100-g product (see Japanese food nutrient analysis tabel, the fourth edition). On the contrary, that of the invention is adjusted to less than 12.4 g.

Fat content can properly be adjusted in the course of sausage manufacturing. Generally, sausage emulsions are prepared by adding salt, nitrite and the like to raw meat, curing the meat in a chilled room for one day, grinding the cured meat and fat individually, chopping the cured meat with seasonings and other additivies in a bowl cutter, and then adding the fat. Consequently, fat content can be adjusted, when fat is added to the mixture comprising the chopped meat, the seasonings and other additives. Likewise, fat contents of other meat, products can properly be adjusted in course of manufacturing.

It is desirable for the meat products of the invention to contain vegetable oil. A ratio of vegetable-oil and animal-fat content is desirably adjusted to approximately 1:1 on weight basis. Soy-bean oil, rape-seed oil, safflower oil, sesame oil, rice-bran oil, olive oil, corn oil, sunflower oil, cotton-seed oil, peanut oil, salad oil and the like, and/or mixtures thereof are examples of the vegetable oil. By using the vegetable oil, the meat products of the invention can be fortified with essential fatty acids including linoleic and linolenic acids and various unsaturated fatty acids possessing physiological functions. As shown by fatty-acid compositions in Table 2 and by adjusting the ratio of vegetable-oil and animal-fat contents to approximately 1:1 on weight basis, the meat products of the invention contain reduced amounts of saturated fatty acids possessing total plasma-cholesterol-level increasing property. Moreover, the meat products of the invention contain more mono- (e.g., oleic acid) and poly-unsaturated fatty acids, which have been reported to reduce the total plasma-cholesterol level, than conventional products. Such, characteristics are considered to exhibit the plasma-cholesterol-suppressing properties of the meat products of the invention. Furthermore, a ratio of saturated:mono-unsaturated:poly-unsaturated fatty-acid contents is improved from 3:3.5:1 of the conventional products to 1.3:3:1 of the products of the invention. The latter value satisfies a ratio of 1:1.5:1 of a well-balanced fatty-acid ratio, suggesting that the meat products of the invention can be sources of mono-unsaturated fatty acids, which have been difficult to obtain through diet.

Examples of favorable fatty-acid composition (%) are as the following: myristic acid, 0.5–1.5; myristoleic acid, 0–0.2; pentadecanoic acid, 0; palmitic acid, 13.0–22.0; palmitoleic acid, 1.5–2.5; heptadecanoic acid, 0–0.3; heptadecenoic acid, 0–0.3; stearic acid, 5.0–9.0; oleic acid, 24.0–60.0; linoleic acid, 9.0–45.0; linolenic acid, 0.2–6.0, arachidic acid, 0.1–1.0; icosenoic acid, 0.2–1.0; and arachidonic acid, 0–0.2.

The meat products of the invention contain soy protein. Examples of soy protein are soy-protein isolate, textured soy-protein, soy-protein concentrate, defatted soy flour and the like. Of them, the soy-protein isolate is favorably used because of its high protein content and excellent binding property. Although amounts of soy protein to be added may vary, those sufficient enough to suppress plasma-cholesterol levels are used. To 100-g final products, usually 1- to 20-g, preferably 5- to 15-g, and more preferably 8- to 10-g soy protein is added depending on protein contents of soy-protein preparations and kinds of meat products. Addition of less than 1-g soy protein may not always exhibit a cholesterol-suppressing effect. Although soy-protein addition of more than 20 g causes no problem, the cholesterol-suppressing effects are attained by addition of the soy protein less than 20 g.

Examples of the meat products of the invention are sausages including pork sausage, Wiener sausage, Frankfurt sausage, Bologna sausage, loaves, hams, bacons, corned beef, hamburger steak, meat balls, such delicatessen meats as Gyoza and Shumai, fresh sausage, bratwurst, ground meat, seasoned meat and the like. Cooked, semi-cooked and/or raw meat products are included. These meat products are conventionally prepared except for both reduction of fat contents and addition of soy protein.

INDUSTRIAL APPLICABILITY

The present invention effectively provides the meat products with favorable texture and taste and plasma-cholesterol-level suppressing property.

Particularly, if both vegetable oil and animal fat are simultaneously added to the meat products as lipids, the products are favorable sources of unsaturated fatty acids which have been reported to exhibit physiological functions including total plasma-cholesterol-suppressing property and the like, since the products contain huge amounts of unsaturated and poly-unsaturated fatty acids. Consequently, the meat products of the invention are useful as functional food, health food and the like.

EXAMPLES

The present invention will be specifically explained in detail with actual experiments and examples, but the scope of the invention is not restricted to them.

Example 1

Lymph nodes and cartilages were carefully removed from porcine thigh meat. A 3.5-kg portion of the thigh meat was ground and blended with 50-g salt, 0.4-g sodium nitrite, 10-g sodium polyphosphate and 800-g ice water with constant agitation for 5 min at 20 rpm. After that, the mixture was transferred into a clean container and allowed to stand for 24 h at 50° C.

Similarly, lymph nodes and cartilage were carefully removed from porcine shoulder meat. A 1.5-kg portion of the shoulder meat was chopped with 1.0-kg ice water, 70-g salt, and 300-g soy-bean oil for 40 sec in a bowl cutter, and then the mixture were chopped with 750-g soy-protein isolate (New Fujipro HN, Fuji-Selyu, Inc., Japan) and 1.0-kg ice water for 60 sec. Thus, a paste-like preparation was prepared.

The paste-like preparation and the ground porcine thigh meat were allowed to stand for 24 and were transferred into a blender and then blended for 3 min at 20 rpm. Thus, sausage emulsion was prepared. The sausage emulsion was stuffed into sheep casing, smoked, cooked to an internal temperature of 70° C., cooled and chilled. Thus, a meat product (sausage) of the invention was prepared.

Nutrient analysis data and fatty-acid components of the prepared sausage are shown in Tables 1 and 2, respectively. As a comparison, those of conventional sausage are also listed (cited from Japanese food nutrient analysis tabel, the fourth edition).

Fatty-acid components of sausages prepared with other vegetable oils in place of the soy-bean oil are listed in Table 3.

TABLE 1

|  | Sausage of the invention | Conventional sausage |
| --- | --- | --- |
| Moisture | 62.6 | 55.5 |
| Protein | 17.4 | 13.1 |
| Fat | 12.1 | 24.8 |
| Carbohydrate | 4.7 | 3.8 |
| Fiber | 0.3 | 0 |
| Ash | 2.9 | 2.8 |
| Energy (Kcal) | 206 | 304 |

TABLE 2

|  |  | Fatty-acid composition (%) | |
| --- | --- | --- | --- |
|  | Fatty acid | Sausage of the invention | Conventional sausage |
| Myristic acid | C14:0 | 0.8 | 1.4 |
| Myristoleic acid | C14:1 | 0.1 | 0.1 |
| Pentadecanoic acid | C15:0 | 0.0 | 0.1 |
| Palmitic acid | C16:0 | 16.5 | 23.5 |
| Palitoleic acid | C16:1 | 1.6 | 2.8 |
| Heptadecanoic acid | C17:0 | 0.2 | 0.4 |
| Heptadecenoic acid | C17:1 | 0.2 | 0.3 |
| Stearic acid | C18:0 | 7.1 | 12.7 |
| Oleic acid | C18:1 | 30.6 | 43.8 |
| Linoleic acid | C18:2 (n-6) | 32.1 | 12.0 |
| Linolenic acid | C18:3 (n-3) | 4.5 | 0.7 |
| Arachidic acid | C20:0 | 0.2 | 0.2 |
| Icosenoic acid | C20:1 | 0.3 | 0.9 |
| Arachidonic acid | C20:4 (n-6) | 0.1 | 0.3 |
| Others |  | 5.5 | 0.8 |
| P/S ratio |  | 1.48 | 0.34 |
| Saturated fatty acid |  | 25 | 38 |
| Mono-unsaturated fatty acid |  | 33 | 48 |
| Poly-unsaturated fatty acid |  | 37 | 13 |

P/S ratio: Poly-unsaturated fatty acids (C18:1,C18:3,C20:4)/Saturated fatty acids (C14:0, C15:0, C16:0, C17:0, C18:0, C20:0)

TABLE 3

| Fatty acid | Fatty-acid composition (%) | | | | | | | | | |
|---|---|---|---|---|---|---|---|---|---|---|
| | Rape-seed oil | Saf-flower oil | Sesame oil | Rice-bran oil | Olive oil | Corn oil | Sun-flower oil | Cotton seed oil | Peanut oil | Salad oil |
| Myristic acid | 0.8 | 0.8 | 0.8 | 0.9 | 0.8 | 0.8 | 0.8 | 1.2 | 0.8 | 0.8 |
| Myristoleic acid | 0.1 | 0.1 | 0.1 | 0.1 | 0.1 | 0.1 | 0.1 | 0.1 | 0.1 | 0.1 |
| Pentadecanoic acid | 0.0 | 0.0 | 0.0 | 0.0 | 0.0 | 0.0 | 0.0 | 0.0 | 0.0 | 0.0 |
| Palmitic acid | 13.2 | 14.9 | 15.8 | 19.4 | 16.3 | 16.9 | 14.6 | 21.6 | 17.3 | 14.2 |
| Palitoleic acid | 1.6 | 1.5 | 1.6 | 1.6 | 1.9 | 1.5 | 1.5 | 1.9 | 1.6 | 1.6 |
| Heptadecanoic acid | 0.2 | 0.2 | 0.2 | 0.2 | 0.2 | 0.2 | 0.2 | 0.2 | 0.2 | 0.2 |
| Heptadecenoic acid | 0.2 | 0.2 | 0.2 | 0.2 | 0.2 | 0.2 | 0.2 | 0.2 | 0.2 | 0.2 |
| Stearic acid | 5.9 | 6.4 | 7.8 | 5.9 | 6.7 | 6.1 | 7.0 | 6.3 | 7.2 | 6.3 |
| Oleic acid | 48.8 | 24.8 | 38.3 | 39.2 | 57.4 | 36.0 | 27.8 | 27.4 | 40.5 | 43.5 |
| Linoleic acid | 15.6 | 44.8 | 27.7 | 22.8 | 9.6 | 30.7 | 41.1 | 34.2 | 23.2 | 20.7 |
| Linolenic acid | 6.0 | 0.4 | 0.6 | 1.0 | 0.7 | 1.1 | 0.7 | 0.6 | 0.4 | 5.6 |
| Arachidic acid | 0.3 | 0.1 | 0.5 | 0.4 | 0.1 | 0.1 | 0.1 | 0.2 | 1.0 | 0.3 |
| Icosenoic acid | 1.0 | 0.2 | 0.4 | 0.5 | 0.2 | 0.2 | 0.2 | 0.3 | 0.9 | 0.8 |
| Arachidonic acid | 0.1 | 0.1 | 0.1 | 0.1 | 0.1 | 0.1 | 0.1 | 0.1 | 0.1 | 0.1 |
| Others | 6.0 | 5.3 | 5.8 | 7.5 | 5.4 | 5.6 | 5.4 | 5.5 | 6.4 | 3.4 |
| P/S ratio | 1.06 | 2.01 | 1.13 | 0.89 | 0.43 | 1.32 | 1.85 | 1.18 | 0.89 | 1.21 |
| Saturated fatty acid | 20 | 22 | 25 | 27 | 24 | 24 | 23 | 30 | 27 | 22 |
| Mono-unsaturated fatty acid | 52 | 27 | 41 | 42 | 60 | 38 | 30 | 30 | 43 | 46 |
| Poly-unsaturated fatty acid | 22 | 45 | 28 | 24 | 10 | 32 | 42 | 35 | 24 | 26 |

P/S ratio: Poly-unsaturated fatty acids (C18:1, C18:3, C20:4)/Saturated fatty acids (C14:0, C15:0, C16:0, C17:0, C18:0, C20:0)

Example 2

As for the sausage prepared in Example 1 (Test variable #1, its sensory properties were evaluated. Cholesterol-suppressing properties were also examined by feeding it to laboratory animals.

To examine effects of not only soy protein but also lipids, sausage containing pork protein/soy-bean oil without soy protein (Test variable #2) and sausage containing pork protein/lard (Test variable #3, conventional sausage) were also prepared as controls. Crude-protein and crud-fat contents of these sausage were adjusted to those of Test variable #1.

Nutrient analysis data (g/100 g) of these sausage are shown in Table 4.

TABLE 4

| | Test variable #1 | Test variable #2 | Test variable #3 |
|---|---|---|---|
| Moisture | 62.6 | 62.6 | 62.6 |
| Protein | 17.4 | 17.4 | 17.4 |
| Fat | 12.1 | 12.1 | 12.1 |
| Carbohydrate | 4.7 | 5.1 | 5.1 |
| Fiber | 0.3 | 0 | 0 |
| Ash | 2.9 | 2.8 | 2.8 |
| (Soy protein) | (7.9) | 0 | 0 |

① Sensory Evaluation

Sensory characteristics of the sausages of Test variables #1, #2 and #3 were examined by a well-trained panel (five men and five women ranging 24 to 40 yr old). Test samples were served as usual, namely immediately after simmering the sausages for 5 min. Overall acceptance was scored by a preference scale (Fact scale). Appearance, color, flavor and texture were scored by 5-point scales according to Japanese Agricultural Standard. The results are shown in Table 5.

As shown in Table 5, the sausage of the invention was judged favorable in respects of appearance, color, flavor and texture. Its binding property was also excellent.

TABLE 5

| | Appearance | Color | Flavor | Texture | Overall acceptance |
|---|---|---|---|---|---|
| #1 | 4.8 | 4.7 | 4.8 | 4.8 | Most favorable |
| #2 | 4.6 | 4.1 | 4.0 | 4.1 | Poor color and flavor |
| #3 | 4.8 | 4.7 | 4.4 | 4.1 | Good color and flavor, but poor texture (tough) and binding property |

② Evaluation of Cholesterol-suppressing Effect

Crude-fat and crude-protein contents of the sausages were determined by Soxhlet and Kjeldahl methods, respectively. Using lyophilized and ground sausages, experimental diets were prepared by adjusting their protein and fat contents to 20% and 12%, respectively. Ingredients of three diets are listed in Table 6.

The feeding experiments were carried out on male SD rats, of which body weight ranged from 120 to 160 g. After preliminary rearing for one week, the diets and water were fed ad libitum (ten rats each). Twenty-eight days later, blood was collected and major organs were eviscerated for macroscopic examination.

The collected blood was conventionally examined for total cholesterol (T-chol.), HDL cholesterol (HDL-chol.), free cholesterol (F-chol.), triglyceride (TG), and phospholipid (PL) with an automatic serum analyzer (AU-510, Olympus, Inc., Japan).

No abnormality was macroscopically observed in such major organs as liver, kidney, spleen, stomach, intestine, heart and lung.

Plasma-lipid levels were analyzed and their data are shown in Table 7 (mean±standard deviation, unit: mg/dl). Statistical analysis among the test variables were carried out by a method of Scheffe et al.

As shown in Table 7, levels of T-chol., HDL-chol., F-chol., TG and PL of the rats fed the sausage of the invention (Test variable #1) were lower than those of the control rats (Test variables # 2 and #3). Suppression of plasma-cholesterol levels by administrating the sausage of the invention was proved.

TABLE 6

|  | Test variable #1 | Test variable #2 | Test variable #3 |
|---|---|---|---|
| Animal protein | 10.0 | 20.0 | 20.0 |
| Vegetable protein | 10.0 | 0.0 | 0.0 |
| Corn starch | 38.3 | 38.3 | 38.3 |
| Sucrose | 20.0 | 20.0 | 20.0 |
| Cellulose | 5.0 | 5.0 | 5.0 |
| Vitamins | 1.0 | 1.0 | 1.0 |
| Minerals | 3.5 | 3.5 | 3.5 |
| Choline bitartrate | 0.2 | 0.2 | 0.2 |
| Animal fat | 6.0 | 0.0 | 12.0 |
| Vegetable oil | 6.0 | 12.0 | 0.0 |

TABLE 7

|  | Diet #1 | Diet #2 | Diet #3 |
|---|---|---|---|
| T-chol. concentration | 55.7 ± 8.3 | 73.3 ± 14.3* | 87.0 ± 15.2* |
| HDL-chol. concentration | 45.7 ± 14.9 | 51.1 ± 15.2 | 49.5 ± 10.3 |
| F-chol. concentration | 28.1 ± 7.7 | 38.4 ± 9.4 | 46.9 ± 9.6** |
| TG concentration | 135.7 ± 35.7 | 185.8 ± 42.1* | 175.6 ± 39.1 |
| PL concentration | 95.2 ± 12.1 | 115.5 ± 18.2 | 131.5 ± 20.8** |

*$p < 0.05$
**$p < 0.01$ (statistically significant against Diet #1)

Experiment 3

Clinical Study

Using the sausage prepared in Example 1, clinical study was carried out with 13 adult male volunteers, whose plasma-cholesterol levels were somewhat higher than normal range. Depending on the Helsinki Declaration, informed consent had been obtained from each volunteer. Three periods were set; one-week pre-observation period before a test period, two-week test period (administration of 135-g sausage equivalent to approximately 11-g soy protein a day) and one-week post-observation period after the test period.

During the entire period, each volunteer had been asked what he ate, nutritionally checked and advised to take diet that are 110% and 120–130% higher energy and fat than that of adequate daily intake, respectively. Each volunteer had been advised to take invariable amounts of total fat, animal fat, vegetable oil, protein, carbohydrate and total energy, too. Blood was collected and body weight was checked at hunger of each volunteer immediately before the beginning of the pre-observation and the test periods and immediately after ends of the test and the post-observation periods. Blood was examined for plasma lipids and other components. Finally, each volunteer was examined by a clinician.

With respect to body weight during the entire period, some of the volunteers gained their weight because of intake of energy-rich diets, although the difference was not significant. No physical disorder was noticed by the doctor.

Changes in total plasma-cholesterol, plasma-HDL-cholesterol, and plasma-tryglyceride levels are shown in FIGS. 1, 2 and 3, respectively. Total plasma-cholesterol and plasma-tryglyceride levels decreased during the test period. On the contrary, levels of plasma HDL cholesterol, which has been recognized to prevent coronary heart disease, increased significantly during the test period.

From these findings, it was elucidated that the meat products of the invention effectively improved such plasma lipids as cholesterol of man with light hypercholesterolemia, even if he took somewhat excessive energy and animal fat.

Example 4

A 2.0-kg portion or porcine thigh meat and 1.0-kg chicken breast meat were ground. They were blended with 1.5 kg of 5-mm chopped onion for 2 min at 12 rpm, and then with 2.0 kg of ice/water, 80 g of salt, 80 g of sugar, 60 g of spices, 500 g of salad oil, 2.5 kg of crust, and 1.3 kg of soy protein isolate (New Fuji-Pro HN) for 5 min at 12 rpm.

Thus prepared batter was formed as hamburger steak, steam-cooked for 15 min to an internal temperature of 80° C., cooled, chilled and vacuum-packaged with sauce. Thus the meat product hamburger steak) of the invention was prepared. Nutrient analysis data and fatty-acid components of the prepared hamburger steak are shown in Tables 8 and 9, respectively. As a comparison, inventor-analyzed data of a conventional product are also indicated.

Fatty-acid components of the hamburger steak prepared with other vegetable oil in place of the salad oil are listed in Table 10.

TABLE 8

|  | Hamburger steak of the invention | Conventional hamburger steak |
|---|---|---|
| Moisture | 63.4 | 59.8 |
| Protein | 13.7 | 10.5 |
| Fat | 7.6 | 17.4 |
| Carbohydrate | 12.4 | 10.4 |
| Fiber | 0.3 | 0 |
| Ash | 2.6 | 1.9 |
| Energy (Kcal) | 180.0 | 240.2 |

TABLE 9

|  |  | Fatty-acid composition (%) | |
|---|---|---|---|
| Fatty acid |  | Hamburger steak of the invention | Conventional hamburger steak |
| Myristic acid | C14:0 | 1.0 | 1.6 |
| Myristoleic acid | C14:1 | 0.1 | 0.4 |
| Pentadecanoic acid | C15:0 | 0.0 | 0.3 |
| Palmitic acid | C16:0 | 15.4 | 24.5 |
| Palitoleic acid | C16:1 | 1.8 | 3.3 |
| Heptadecanoic acid | C17:0 | 0.2 | 0.7 |
| Heptadecenoic acid | C17:1 | 0.2 | 0.6 |
| Stearic acid | C18:0 | 6.9 | 10.4 |
| Oleic acid | C18:1 | 43.1 | 44.2 |
| Linoleic acid | C18:2 (n-6) | 19.4 | 9.4 |
| Linolenic acid | C18:3 (n-3) | 5.0 | 0.7 |
| Arachidic acid | C20:0 | 0.3 | 0.3 |
| Icosenoic acid | C20:1 | 0.8 | 0.4 |
| Arachidonic acid | C20:4 (n-6) | 0.1 | 0.5 |
| Others |  | 5.7 | 2.9 |
| P/S ratio |  | 1.03 | 0.28 |
| Saturated fatty acid |  | 24 | 38 |
| Mono-unsaturated fatty acid |  | 46 | 49 |
| Poly-unsaturated fatty acid |  | 25 | 11 |

TABLE 10

| Fatty acid | Fatty-acid composition (%) | | | | | | | | | |
|---|---|---|---|---|---|---|---|---|---|---|
| | Soybean oil | Rapeseed oil | Safflower | Sesame oil | Rice-bran oil | Olive oil | Corn oil | Sunflower oil | Cotton seed oil | Peanut oil |
| Myristic acid | 1.0 | 1.0 | 1.0 | 1.0 | 1.0 | 1.0 | 1.0 | 1.0 | 1.3 | 1.0 |
| Myristoleic acid | 0.1 | 0.1 | 0.1 | 0.1 | 0.1 | 0.1 | 0.1 | 0.1 | 0.1 | 0.1 |
| Pentadecanoic acid | 0.0 | 0.0 | 0.0 | 0.0 | 0.0 | 0.0 | 0.0 | 0.0 | 0.0 | 0.0 |
| Palmitic acid | 17.5 | 14.5 | 16.1 | 16.9 | 20.1 | 17.3 | 17.9 | 15.8 | 22.0 | 18.2 |
| Palitoleic acid | 1.8 | 1.9 | 1.8 | 1.9 | 1.9 | 2.1 | 1.8 | 1.8 | 2.1 | 1.8 |
| Heptadecanoic acid | 0.2 | 0.2 | 0.2 | 0.2 | 0.2 | 0.2 | 0.2 | 0.2 | 0.2 | 0.2 |
| Heptadecenoic acid | 0.2 | 0.2 | 0.2 | 0.2 | 0.2 | 0.2 | 0.2 | 0.2 | 0.2 | 0.2 |
| Stearic acid | 7.6 | 6.6 | 7.0 | 8.3 | 6.5 | 7.3 | 6.8 | 7.5 | 6.9 | 7.7 |
| Oleic acid | 31.7 | 47.9 | 26.6 | 38.5 | 39.3 | 55.5 | 36.5 | 29.2 | 28.9 | 40.5 |
| Linoleic acid | 29.6 | 14.9 | 40.8 | 25.7 | 21.3 | 9.6 | 28.3 | 37.6 | 31.4 | 21.7 |
| Linolenic acid | 4.1 | 5.4 | 0.4 | 0.6 | 1.0 | 0.7 | 1.0 | 0.7 | 0.6 | 0.4 |
| Arachidic acid | 0.2 | 0.3 | 0.1 | 0.4 | 0.4 | 0.1 | 0.1 | 0.1 | 0.2 | 0.9 |
| Icosenoic acid | 0.3 | 1.0 | 0.3 | 0.4 | 0.5 | 0.3 | 0.3 | 0.3 | 0.3 | 0.8 |
| Arachidonic acid | 0.1 | 0.1 | 0.1 | 0.1 | 0.1 | 0.1 | 0.1 | 0.1 | 0.1 | 0.1 |
| Others | 5.5 | 5.9 | 5.3 | 5.7 | 7.3 | 5.5 | 5.7 | 5.4 | 5.6 | 6.3 |
| P/S ratio | 1.28 | 0.91 | 1.70 | 0.99 | 0.79 | 0.40 | 1.14 | 1.56 | 1.05 | 0.79 |
| Saturated fatty acid | 26 | 23 | 24 | 27 | 28 | 26 | 26 | 25 | 31 | 28 |
| Mono-unsaturated fatty acid | 34 | 51 | 29 | 41 | 42 | 58 | 39 | 32 | 32 | 43 |
| Poly-unsaturated fatty acid | 34 | 21 | 41 | 26 | 22 | 10 | 30 | 38 | 32 | 22 |

P/S ratio: poly-unsaturated fatty acids (C18:1, C18:3, C20:4)/Saturated fatty acids(C14:0, C15:0, C16:0, C17:0, C18:0, C20:0)

What is claimed is:

1. A meat product containing as lipids approximately the same content of vegetable oil and animal fat, said meat product comprising:

(a) a fat content of less than half of that present in conventional meat products, and (b) 8 to 10 g of soy protein isolate per 100 g of meat product, said lipids having a fatty-acid composition comprising:

0.5–1.5% myristic acid; 0–0.2% myristoleic acid; 13.0–22.0% palmitic acid; 1.5–2.5% palmitoleic acid; 0–0.3% heptadecanoic acid; 0–0.3% heptadecenoic acid; 5.0–9.0% stearic acid; 24.0–60.0% oleic acid; 9.0–45.0% linoleic acid; 0.2–6.0% linolenic acid; 0.1–1.0% arachidic acid; 0.2–1.0% icosenoic acid; and 0–0.2% arachidonic acid, wherein the meat product possesses a plasma-cholesterol-suppressing property.

2. The meat product claimed in claim 1, wherein the vegetable oil is at least one oil selected from the group consisting of soybean oil, rapeseed oil, safflower oil, sesame oil, and rice-bran oil.

3. The meat product claimed in any one of claims 2 and 1, wherein the meat product is selected from the group consisting of pork sausage, Wiener sausage, Frankfurt sausage, Bologna sausage, loaves, hams, bacon, corned beef, hamburger steak, meat balls, Gyoza and Shumai meats, fresh sausages, bratwursts, ground meat, and seasoned meat.

4. A method for suppressing plasma-cholesterol levels in man, comprising administering a meat product as claimed in claim 2 to man.

5. A method for suppressing plasma-cholesterol levels in man, comprising administering a meat product as claimed in claim 1 to man.

6. The method claimed in one of claims 5 or 4, wherein the meat products are selected from the group consisting of pork sausage, Wiener sausage, Frankfurt sausage, Bologna sausage, loaves, hams, bacon, corned beef, hamburger steak, meat balls, Gyoza and Shumai meats, fresh sausages, bratwursts, ground meat, and seasoned meat.

7. The meat product claimed in claim 1, wherein the meat product is sausage, and the fat content is less than 12.4 g per 100 g of sausage.

8. The meat product claimed in claim 1, wherein the meat product is hamburger steak, and the fat content is less than 7.6 g based on 100 g of hamburger steak.

* * * * *